UNITED STATES PATENT OFFICE.

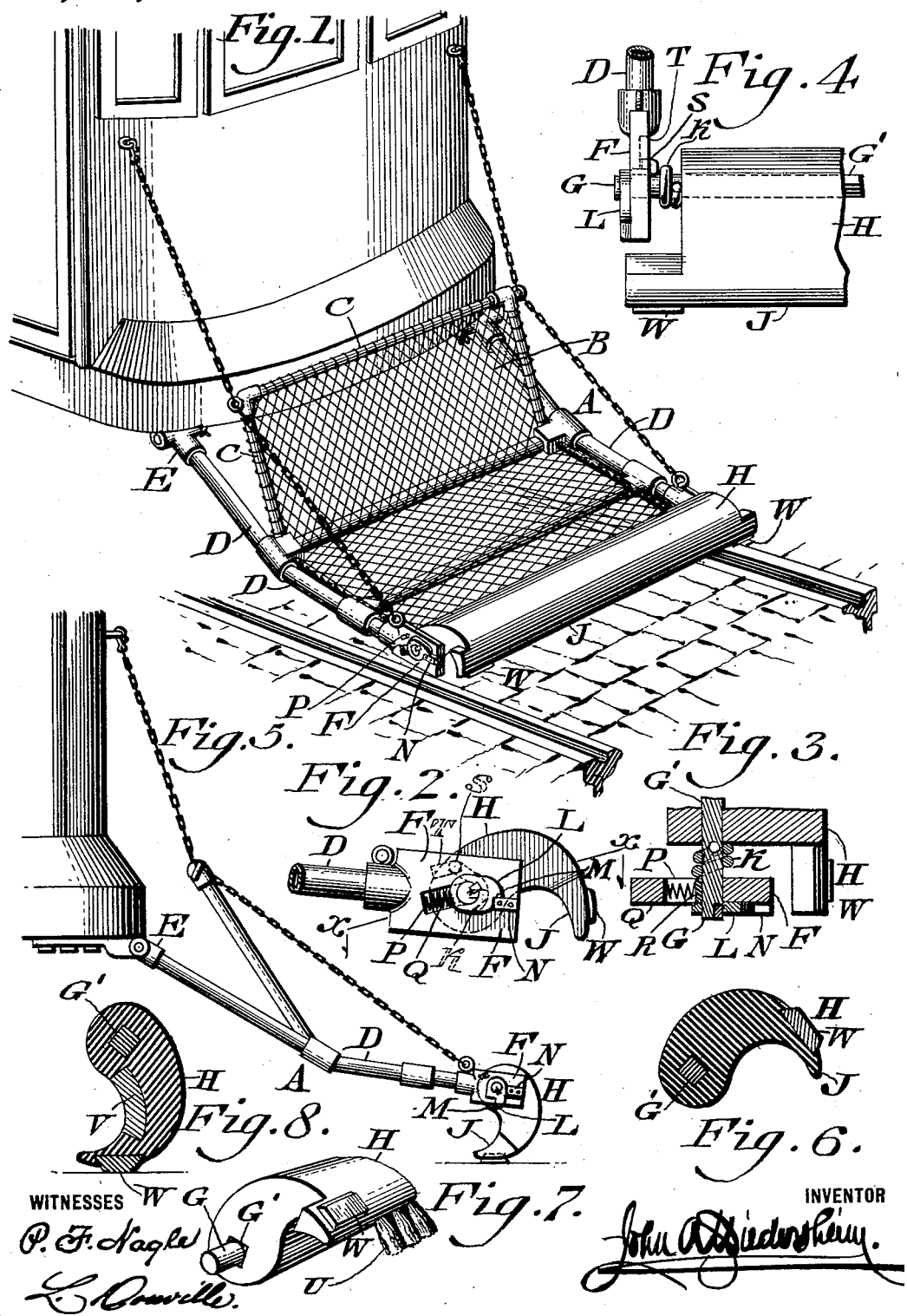

JOHN A. WIEDERSHEIM, OF PHILADELPHIA, PENNSYLVANIA.

FENDER FOR CARS AND OTHER VEHICLES.

1,007,318.        Specification of Letters Patent.     Patented Oct. 31, 1911.

Application filed May 15, 1911. Serial No. 627,247.

*To all whom it may concern:*

Be it known that I, JOHN A. WIEDERSHEIM, a citizen of the United States, residing in the city and county of Philadelphia, State of Pennsylvania, have invented a new and useful Fender for Cars and other Vehicles, of which the following is a specification.

My invention consists of a guard for a fender of a car or other vehicle which is composed of a member normally elevated from a road-bed and rails and adapted to be automatically released and brought close to said road-bed and rails, so as to close the space between the road-bed and rails, said guard thus preventing a person or object struck by the fender from being caught under the same and said person or object being deflected upwardly on the guard and landed on the fender.

The invention is satisfactorily illustrated in the accompanying drawing, but the important instrumentalities thereof may be varied, and so it is to be understood that the invention is not limited to the specific arrangement and organization shown and described.

Figure 1 represents a perspective view of a car fender embodying my invention. Fig. 2 represents a side elevation of a detached portion on an enlarged scale. Fig. 3 represents a section thereof on line *x—x* Fig. 2. Fig. 4 represents a top or plan view of a detached portion. Fig. 5 represents a side elevation of the fender, certain parts being in different positions from those shown in Fig. 1. Fig. 6 represents a section of the guard employed, the same being on an enlarged scale. Fig. 7 represents a perspective view of another form of the guard. Fig. 8 represents a section of another form of a guard embodying my invention.

Similar letters of reference indicate corresponding parts in the figures.

Referring to the drawings:—A designates a fender which is composed of a net or bed B, and a frame C therefor, both in general respects of ordinary construction, generally pivotal so as to permit the fender to be raised and lowered or removed as occasion may require.

D designates the side arms, the rear ends whereof are connectible with a proper part of a car by means E usual in such cases. To the front ends of said arms D are secured the plates F, in which are rotatably mounted the gudgeons or journals G provided on the end of the shaft G' of the shoe or guard H, which latter is composed of a head partly or entirely of soft rubber or rubber compound or other suitable pliable or yielding material, the same curving from rear to front and its front edge portion J being reduced in thickness and so rendered more pliable, said portion projecting somewhat downwardly in the normal position of the shoe, the latter, as evident, occupying the front of the fender and extending transversely thereon or from side to side thereof. The shoe is eccentric in its mounting on the fender frame, that is, it has its front portion projecting farther from its axis of rotation than its rear portion, so that the shoe may be rotated in one direction to bring such front portion into contact or engagement with the roadbed and rails and may be rotated in the other direction to raise said portion out of engagement with the roadbed or rails.

Connected with the gudgeons G are the springs K, which coil around said gudgeons and are also connected with the plates F, their tendency being to rotate forwardly the shoe H so as to bring its front point downward in the direction toward the roadbed. In order, however, to control said shoe whereby it is held elevated from the roadbed, there are connected with the outer ends of the gudgeons G the detents L, which are adapted to rotate with said gudgeons, the tooth or shoulder M on each detent being adapted to be engaged by the dog or pawl N on the side of the plate F, thus locking the detent and consequently causing the shoe to be held in its normal or elevated position. In order, however, to disconnect the detents from the dogs, the openings or slots P in the plates F, which receive the gudgeons G of the shoe, are elongated, so that said gudgeons are adapted to slide rearwardly therein, but the detents are held into engagement with the dogs or pawls N by the action of the springs Q, which, in the present case, are held against the rear walls of the slots P and against the blocks R which occupy said slots and have the gudgeons G bearing against the same, it being evident that by these means the gudgeons are pressed toward the front ends of the slots P, and the detents L are caused to remain in engagement with the dogs N, whereby the shoe retains its normal position as shown in Figs. 1 and 2. As the tendency of the springs K is to move rearwardly with the gudgeons and shoe, as will be referred to hereafter, the rear ends S of said springs are fitted movably in the slots T in the sides of the plates F so as to slide therein, while being held firmly with relation to the gudgeons in order to cause the proper action of the springs on the shoe.

The operation is as follows:—When a person is in the path of the fender and is struck by the shoe thereof, the blow causes the latter to slide rearwardly on its gudgeons in the plates F. This removes the detents from the dogs or pawls, and as the former are no longer controlled by the latter, the springs K become operative to turn the shoe downward, which they do, and thus the shoe has its front point portion advanced against the roadbed and rails and bent rearwardly thereagainst, so as to prevent the existence of a space between the front of the shoe and the roadbed and rails. Consequently the person struck will not be caught and rolled injuriously under the shoe toward the wheels, truck or running gear of the car, but may fall on the shoe, when he will be shoved upwardly thereon as on an inclined plane and landed into the net or bed of the fender without material injury. In Fig. 7, the shoe is illustrated as composed of a head H and a front portion of brush material U connected therewith, which is adapted to act similarly to the front edge portion J of the shoe in the other figures. In order to cause the shoe to be automatic in its downwardly rotary motion without the employment of the springs K, the shoe may have attached to it the weighted plate V, as in Fig. 8, so as to load the portion of the shoe below its pivot, whereby when it is released, it will rotate by gravity to the position on the road bed and rails as in Fig. 8. The shoe may be reset by rotating it in an upward direction, when the backs of the detents will ride on the dogs or pawls N until the teeth M clear the latter, when said teeth will spring into engagement with the dogs, thus locking the shoe in its normal position, as in Figs. 1 and 2, this being due to the forward pressure of the springs Q against the gudgeons of said shoe, as hereinbefore stated. While the main portion of the front of the shoe may be advanced toward or to the road bed, and may, if desired, contact firmly with the same, it is advisable that said portion be brought close to the road bed so as to avoid the existence of the space hereinbefore referred to without absolutely sweeping or wiping the road bed and being ground by the same.

It is evident that the shoe may serve as a brake by contacting with the rails. For this purpose I secure to the opposite side portions of the front of the shoe the brake shoes W, which are formed of metal or material harder than the shoe and are so disposed that when the shoes are turned or tilted downwardly, they will contact with and ride upon the rails and by their friction serve to brake and retard the motion of the car.

Having thus described my invention what I claim as new and desire to secure by Letters Patent, is:—

1. A fender frame, an automatically rotatable guard at the front thereof, a shaft carrying the same, bearings on said frame in which said shaft is rotatable and slidable and interengaging means on said frame and guard adapted positively to lock said guard in normal elevated position, said means being adapted to be disengaged by impact on the guard from in front to allow the guard to automatically tilt forward toward the road bed.

2. In a fender, a fender frame, an automatically rotatable guard at the front thereof, a shaft carrying the same, bearings on the fender in which said shaft is rotatable and slidable, and interengaging locking means on said guard and frame adapted to positively lock said guard in normal elevated position, said guard being adapted, when subjected to impact from in front, to shift in its bearings, and thereby disengage said locking members, permitting the guard to tilt automatically toward the roadbed.

3. In a fender, a fender frame, a transversely extending automatically rotatable guard at the front thereof, means for rotatably mounting said guard on said frame, means for arbitrarily positively controlling said guard against rotation, and mechanism adapted for releasing automatically said controlling means when the guard is subjected to impact from in front, whereby the guard is rotated to a road bed.

4. In a fender, a fender frame, a transversely extending automatically rotatable guard at the front thereof, a shaft rotatably mounted on the frame and carrying said guard, means on said shaft and frame adapted to hold the guard positively elevated from a roadbed, and mechanism adapted to disengage said means when the guard is subjected to impact from in front whereby the guard is tilted toward said roadbed.

5. In a fender, a fender frame, an automatically rotatable guard at the front thereof, a rotatable shaft carrying said guard having its bearings on said frame, a detent on said shaft, an engaging member on said frame, said detent and member being adapted to control said guard in its normal position elevated from a road bed, and means adapted to cause said shaft to slide in its bearings, whereby when the guard is subjected to impact in front, said member and detent are disengaged and the shoe is released and caused to bodily tilt toward said road bed.

6. In a fender, a fender frame, an automatically rotatable guard at the front thereof, slots in the sides of the frame, a shaft for said guard, the same being rotatively and slidingly mounted in said slots, a detent on said shaft, a member with which said detent is engageable in the normal position of said guard, and resilient means adapted to bear against said shaft to retain said detent and member in engagement, said member and detent being adapted to be disengaged by impact on the guard from in front, and sliding motion is adapted to be imparted to the guard whereby the latter is released and caused to bodily tilt downwardly toward the road bed.

7. In a fender, a fender frame, an automatically rotatable guard at the front thereof, a shaft carrying the same, bearings on the frame in which said shaft is rotatable and slidable, and locking devices on said shaft and frame adapted positively to retain said guard in normal position elevated from a road bed, said guard being adapted, when subjected to impact from in front, to shift in its bearings and thus disengage said locking devices permitting the guard to tilt toward the road bed.

8. In a fender, a fender frame, an automatically rotatable guard at the front thereof, a shaft carrying the same, bearings on the frame in which said shaft is rotatable and slidable, interengaging locking members on said guard and frame adapted positively to retain and control said guard in normal position elevated from a road bed, and resilient means on the frame adapted to bear against said guard and thereby hold said locking members in engagement, said guard being adapted, when subjected to impact from in front, to shift in its bearings, and thereby disengage said locking members permitting the guard to tilt automatically toward the road bed.

9. In a fender, a fender frame, a rotatable guard at the front thereof, a shaft carrying the same, a slot in a member of the frame forming rotatable and slidable bearings for said shaft, a spring connected with said guard and frame adapted to rotate said guard in the direction toward a road bed, interengaging locking members on said guard and frame adapted positively to retain and control said guard in normal position elevated above said road bed, and means on said members adapted to have an end of said spring slide thereon when the guard is shifted rearwardly due to impact thereon from in front.

10. In a car fender, a fender frame, a guard mounted thereon and adapted to be bodily tilted downwardly, impact-actuated means normally positively locking said guard in elevated position and a brake shoe connected with said guard and adapted to be brought into frictional contact with railway rails.

11. In a car fender, a fender frame, a rotatably mounted guard at the forward end thereof, a shaft carrying said guard and mounted for both rotary and sliding movement, means for positively locking the guard in elevated position, and means for turning said guard bodily downward in a curved path when said locking means are released by impact on the front of the guard.

JOHN A. WIEDERSHEIM.

Witnesses:
N. BUSSINGER,
WM. CANER WIEDERSEIM.

Copies of this patent may be obtained for five cents each, by addressing the "Commissioner of Patents, Washington, D. C."